United States Patent
Laroia et al.

(10) Patent No.: US 6,748,566 B1
(45) Date of Patent: Jun. 8, 2004

(54) ENSURING PROPER ACCEPTANCE OF DATA AT A RECEIVER IN WIRELESS MULTIPLE ACCESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 296 days.

(21) Appl. No.: 09/620,797

(22) Filed: Jul. 21, 2000

(51) Int. Cl.$^7$ .................................................. H04L 1/18
(52) U.S. Cl. ........................ 714/751; 370/342; 370/343; 370/480
(58) Field of Search ................................. 714/751, 752; 370/342, 343, 480; 340/825.52, 5.6, 5.61, 825.69; 455/91

(56) References Cited

U.S. PATENT DOCUMENTS

| | | | | |
|---|---|---|---|---|
| 4,193,115 A | * | 3/1980 | Albus .......................... 364/300 |
| 4,744,086 A | * | 5/1988 | Komly et al. ................. 371/40 |
| 5,062,111 A | * | 10/1991 | Gotou et al. ............... 371/37.1 |
| 5,282,222 A | * | 1/1994 | Fattouche et al. ............. 375/1 |
| 5,353,302 A | * | 10/1994 | Bi ................................ 370/342 |
| 5,434,847 A | * | 7/1995 | Kou ............................. 370/17 |
| 5,442,626 A | * | 8/1995 | Wei .............................. 370/20 |
| 5,606,569 A | * | 2/1997 | MacDonald et al. ....... 371/37.7 |
| 5,608,739 A | * | 3/1997 | Snodgrass et al. ......... 371/37.1 |
| 5,636,208 A | * | 6/1997 | Chang et al. ............... 370/347 |
| 5,646,935 A | * | 7/1997 | Ishikawa et al. ............ 370/207 |
| 6,088,814 A | * | 7/2000 | McKenzie et al. ............ 714/6 |
| 6,192,506 B1 | * | 2/2001 | Vishnubhatla et al. ........ 716/4 |
| 6,219,386 B1 | * | 4/2001 | Amrany et al. ............ 375/261 |
| 6,370,666 B1 | * | 4/2002 | Lou et al. ................... 714/751 |
| 6,381,728 B1 | * | 4/2002 | Kang ......................... 714/781 |
| 6,427,219 B1 | * | 7/2002 | Yang .......................... 714/758 |

* cited by examiner

*Primary Examiner*—Albert Decady
*Assistant Examiner*—Dipakkumar Gandhi (57) ABSTRACT

In a multiple access communications system data to be transmitted to a particular end-user receiver is processed with a specific process assigned to the particular end-user. The processing is such that an output array of data bits after processing has the same number of bits as an input array of data bits but is unique to the particular end-user. Then, the data is only recoverable at the end-user receiver by using a process that is the exact inverse of the process employed at the transmitter and assigned to the particular end-user receiver. Consequently, the data is identified to the particular end-user without having to transmit additional identification information.

107 Claims, 4 Drawing Sheets

ENSURING PROPER ACCEPTANCE OF DATA AT A RECEIVER IN WIRELESS MULTIPLE ACCESS COMMUNICATIONS SYSTEMS

TECHNICAL FIELD

This invention relates to wireless multiple access communications systems and, more particularly, to proper data reception in such systems.

BACKGROUND OF THE INVENTION

In wireless communications systems employing multiple access, users share a transmission medium. One such wireless system is the orthogonal frequency division multiplexing (OFDM) based spread spectrum multiple access mobile communications system. In such systems, it is important that users are prevented from receiving packets meant for other users. So-called fixed channel assignment techniques have been employed to address this problem by allocating channels that are dedicated to individual users. Unfortunately, such fixed channel assignment of communications channels is not efficient for data traffic. In Ethernet systems, packets are transmitted with identification numbers of the users they are intended for so that other users can drop the packets after they are decoded. The cost of such a technique is the overhead needed to transmit a user identification number in each packet that is substantial in, for example, wireless multiple access communications systems.

SUMMARY OF THE INVENTION

These and other problems related to the correct and proper reception of data at a receiver in a multiple access communications system are overcome by processing data to be transmitted to a particular end-user receiver with a specific process assigned to the particular end-user. The processing at a transmitter is such that an output array of data bits after processing has the same number of bits as an input array of data bits but is unique to the particular end-user. Then, the data is only recoverable at the end-user receiver by using a process that is the exact inverse of the process employed at the transmitter and assigned to the particular end-user receiver. Consequently, the data is identified to the particular end-user without having to transmit additional identification information.

In an embodiment of the invention, information bits, e.g., a segment of bits, to be transmitted are encoded to provide an error detection capability at a remote receiver. The encoded segment of bits, i.e., an array of bits, is then processed using a particular end-user dependent function of the encoded array of bits and associated with a user dependent index to generate an output array of bits the same size as the encoded array of bits. The output array of bits is modulated and transmitted. At a remote end-user unit, a received version of the transmitted signal is demodulated to obtain a received array of bits. An exact inverse end-user function of the encoded array of bits and associated with the user dependent index corresponding to the end-user function used at the transmitter is employed to de-map the array of received bits to obtain a received version of the encoded array of bits. This encoded array of bits is decoded, and if it is an array of bits intended for this particular end-user it is properly decoded and accepted. If the decoded array of bits were not intended for this particular end-user, it would not be properly decoded and is dropped.

In another embodiment of the invention, the user dependent function is of only redundancy bits generated by error detection encoder and associated with the user dependent index. Specifically, in one example, the transmitter user dependent function is of the bits of a frame check sum (FCS) sequence generated by a FCS encoder and associated with the user dependent index. The receiver user dependent function is the inverse function of the bits of a frame check sum (FCS) sequence and associated with the user dependent index.

DETAILED DESCRIPTION

Figure 1:
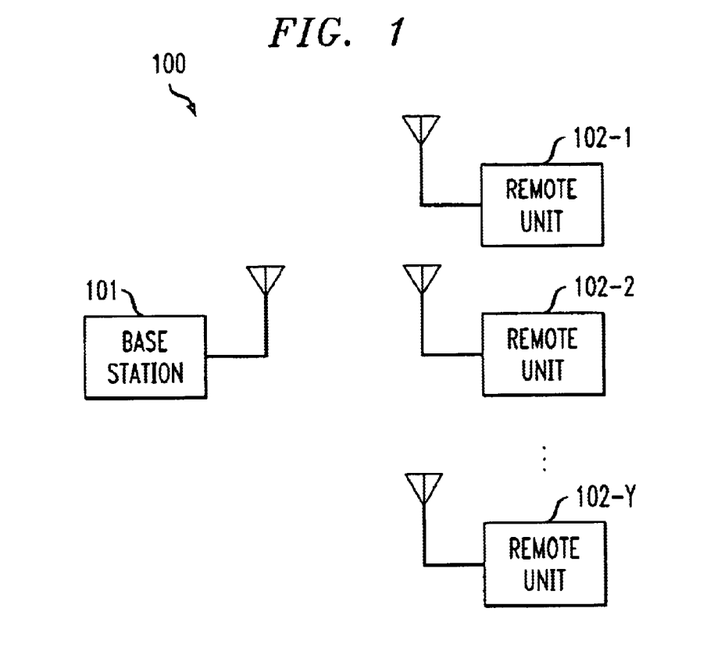
FIG. 1 shows, in simplified block diagram form, a multiple access transmission system in which the invention may be advantageously employed.

FIG. 1 shows, in simplified block diagram form, a wireless mobile multiple access communications system in which the invention may be advantageously employed. It should be noted that although applicants' unique invention will be described in the context of a wireless mobile communications system, it has equal application to non-mobile systems. As indicated above, one such mobile wireless communications system is OFDM based spread spectrum multiple access.

Specifically, shown in FIG. 1 is a mobile multiple access wireless communications system 100. System 100 includes base station 101 and one or more remote mobile units 102-1, 102-2 through 102-Y. Transmission of signals is from and to base station 101 to and from remote mobile units 102. All of mobile units 102 share the transmission spectrum in a dynamic fashion. In particular, base station 101 dynamically broadcasts the assignment of data traffic channels to the remote mobile units 102. Remote mobile units 102 monitor the broadcast channel assignments via assignment messages. After detecting its assigned channel, a particular remote mobile unit 102 then receives is data segments in the assigned data traffic channel. However, because the data traffic channels are not always reliable in a wireless communications system, the assignment messages may not be delivered correctly to their corresponding remote mobile units 102. Indeed, problems arise when a particular one of remote mobile units 102 decodes the assignment message in error and mistakenly takes a traffic segment intended for some other one of remote mobile units 102.

Figure 2A:
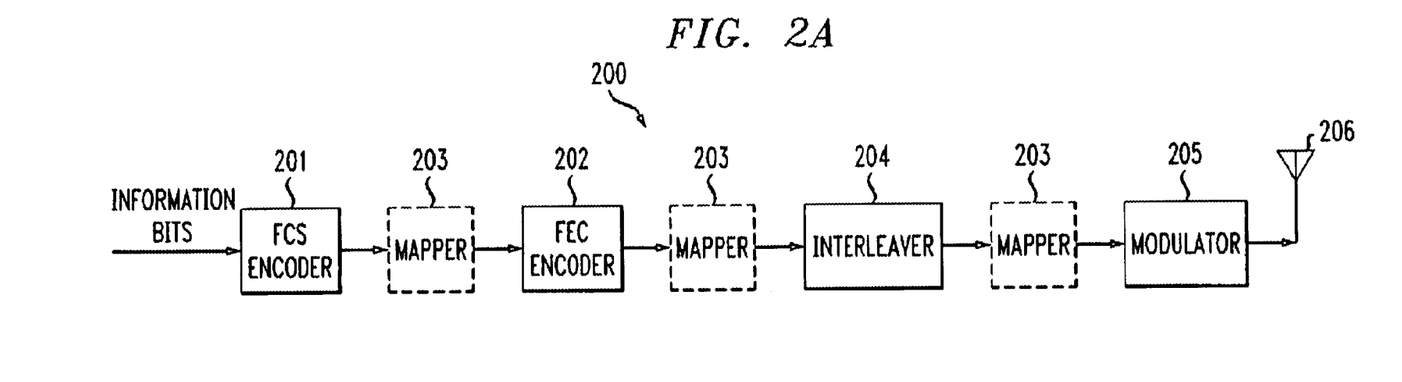
FIG. 2A shows, in simplified block diagram form, details of a transmitter that may be utilized in the base station and/or remote mobile units shown in FIG. 1.

FIG. 2A shows, in simplified block diagram form, details of a transmitter 200 that may be utilized in the base station 101 and/or remote mobile units 102 shown in FIG. 1. As shown, information bits, e.g., in segments, from some data source are supplied to frame check sum (FCS) encoder 201. FCS encoder 201 generates and adds redundancy bits to the bits in the segment to form a first block having a fixed number of bits, in well known fashion. The first block of bits from FCS encoder 201 is supplied directly to forward error coding (FEC) encoder 202 or via mapper 203 to FEC encoder 202. Mapper 203 is an end-user dependent processing unit and is described below. For now it is enough to state that mapper 203 inserts a specific user function unique to a particular end-user into an input block of bits, and that a block of bits outputted from mapper 203 is the same size as a block of bits inputted to it. Consequently, the operation of mapper 203 does not cost any overhead in the bit stream being transmitted. FEC encoder 202 also adds redundancy bits to the first block of bits from FSC encoder 201 or mapper 203 for the purpose of error correction at the remote receiver and forms a second block of bits. The second block of bits is outputted from FEC encoder 202 directly to bit interleaver 204 or via mapper 203 to interleaver 204. Mapper 203 operates on the second block of bits in the same manner as the first block of bits, as described above. Interleaver 204 basically changes the order of the bits in the block supplied to it for the purpose of randomizing bursty noise in the corresponding wireless data traffic channel, in well known fashion. The interleaved block of bits outputted from interleaver 204 is supplied directly to modulator 205 or via mapper 203 to modulator 205. Again, operation of mapper 203 is as described above. The modulated output from modulator 205 is supplied to antenna 206 for transmission. Thus, it is seen that mapper 203 can be located, in this example, between FSC encoder 201 and FEC encoder 202, or between FEC encoder 202 and interleaver 203, or between interleaver 203 and modulator 205.

Figure 2B:
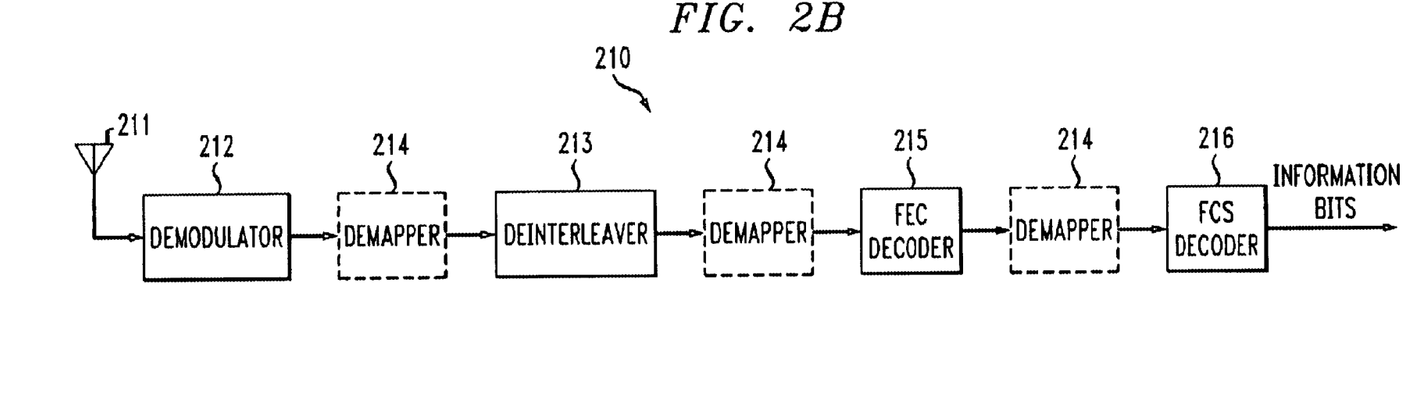
FIG. 2B shows, in simplified block diagram form, details of a receiver that may be utilized in the base station and/or remote mobile units shown in FIG. 1.

FIG. 2B shows, in simplified block diagram form, details of a receiver 210 that may be utilized in the base station 101 and/or remote mobile units 202 shown in FIG. 1. Specifically, a transmitted signal from, for example, transmitter 200 in base station 101 is received at antenna 211 at receiver 210. The received signal is supplied to demodulator 212 where it is demodulated as a series of symbols, in well known fashion. The symbols are supplied directly to deinterleaver 213 or via demapper 214 to deinterleaver 213. Operation of demapper 214 is the exact inverse of the operation of mapper 203 described above and will be further described below. Deinterleaver operates to organize the bits of the symbols to be in proper order for processing by forward error correction (FEC) decoder 215. Again, the output symbols from deinterleaver 213 may be supplied directly to FEC decoder 215 or via demapper 214 to FEC decoder 215. FEC decoder 215 converts the symbols to a block of decoded FEC bits and also corrects for symbol errors caused by channel impairments or noise, in known fashion. The block of decoded FEC bits outputted by FEC decoder 215 is supplied directly to frame check sum (FCS) decoder 216 or via demapper 214 to FCS decoder 216. FCS decoder 216 is operative to detect whether any uncorrected errors still remain. If so, the decoded FEC block of bits is discarded. Otherwise, FCS decoder 216 removes the FCS redundancy bits from the decoded FEC block of bits and the resulting information bits are forwarded for further processing. Demapper 214 may be located between demodulator 212 and deinterleaver 213, or between deinterleaver 213 and FEC decoder 215, or between FEC decoder 215 and FCS decoder 216. However, the demapper 214 must be located at a position in the receiver 210 chain that corresponds to the location of mapper 203 in the transmitter 200 chain.

Thus, if mapper 203 is located between FCS encoder 201 and FEC encoder 202, demapper 214 must be located between FEC decoder 215 and FCS decoder 216. Similarly, if mapper 203 is located between FEC encoder 202 and interleaver 204, demapper 214 must be located between deinterleaver 213 and FEC decoder 215. Finally, if mapper 203 is located between interleaver 204 and modulator 205, demapper 214 must be located between demodulator 212 and deinterleaver 213.

Figure 3A:
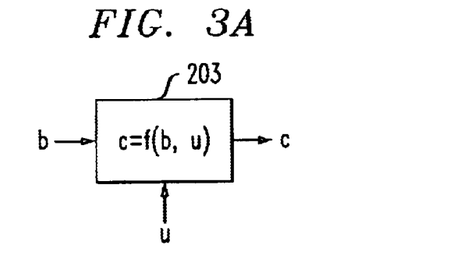
FIG. 3A illustrates, in simplified block diagram form, a user dependent processing unit, i.e., mapper unit, that may be advantageously employed in the transmitter of FIG. 2A.

FIG. 3A illustrates, in simplified block diagram form, a user dependent processing unit, i.e., mapper unit 203, which may be advantageously employed in the transmitter 200 of FIG. 2A. Inputs to mapper 203 are a block of bits, namely, array of bits "b" from an information source and a user index "u" from an index source. Note that user index "u" is specific to the particular end-user, i.e., it is unique to a particular one of remote mobile units 102. The output of mapper 203 is another block of bits, namely, array of bits "c". It is important to note that array "b" and array "c" are the same size. Consequently, no overhead is added to the bit stream by the user dependent processing. The relationship between output array "c" from mapper 203 and the inputs to mapper 203 is expressed by the user dependent function c=f(b,u). Note that for distinct "b" vectors mapper 203 generates distinct "c" vectors.

Figure 3B:
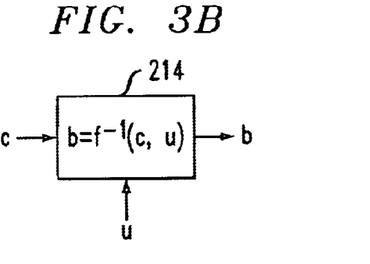
FIG. 3B illustrates, in simplified block diagram form, a user dependent processing unit, i.e., de-mapper unit, that may be advantageously employed in the receiver of FIG. 2B.

FIG. 3B illustrates, in simplified block diagram form, a user dependent processing unit, i.e., demapper unit 214, which may be advantageously employed in the receiver 210 of FIG. 2B. Inputs to demapper 214 are a block of bits, namely, the array of bits "c", and the user index "u". The output of demapper 214 is another block of bits, namely, array of bits "b". It is important to note that array "b" and array "c" are the same size. Consequently, no overhead has been added to the bit stream by the user dependent processing. The relationship between output array "b" from demapper 214 and the inputs to demapper 214, i.e., input array "c" is expressed by the function $b=f^{-1}(c,u)$ that is the exact inverse function used in mapper 203, namely, c=f(b,u). Note that for distinct "c" vectors demapper 214 generates distinct "b" vectors.

Figure 4A:
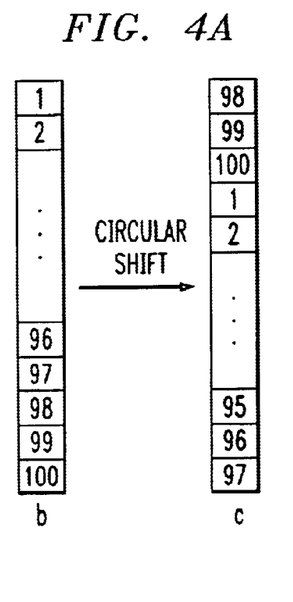
FIG. 4A graphically illustrates an example implementation of the user dependent processing unit of FIG. 3A employing a first circular shift for a first end-user.
Figure 4B:
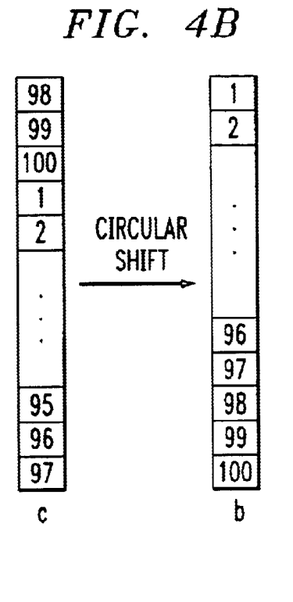
FIG. 4B graphically illustrates a first example implementation of the user dependent processing unit of FIG. 3B employing an exact inverse of the first circular shift illustrated in FIG. 4A.
Figure 5A:
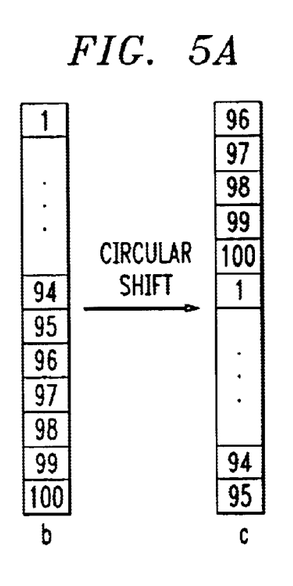
FIG. 5A graphically illustrates a second example implementation of the user dependent processing unit of FIG. 3A employing a second circular shift for a second end-user.

FIG. 4A graphically illustrates an example implementation of the user dependent processing unit, namely, mapper 203, of FIG. 3A employing a first circular shift for a first end-user. FIG. 4B graphically illustrates a first example implementation of the user dependent processing unit, namely, demapper 214, of FIG. 3B employing an exact inverse of the first circular shift illustrated in FIG. 4A. FIG. 5A graphically illustrates a second example implementation of the user dependent processing unit, namely, mapper 203, of FIG. 3A employing a second circular shift for a second end-user. While FIG. 5B graphically illustrates a second example implementation of the user dependent processing unit, namely, demapper 214, of FIG. 3B employing an exact inverse of the second circular shift illustrated in FIG. 5A.

Specifically, at the transmitter 200 in mapper 203 (FIGS. 4A and 5A), the input array "b" contains N bits, denoted as $b(0), b(1), \ldots, b(N-1)$. The output array "c" contains the same number of bits, denoted as $c(0), c(1), \ldots, c(N-1)$. Array "c" is a cyclic shifted version of "b", that is, $c(i)=b(i-i0 \bmod N)$, for $i=0, \ldots, N-1$, where i0 is an offset index, which is unique to each remote mobile unit 202. In receiver 210w the first user (FIGS. 4A and 4B) is given its offset index i0=3 and the second user (FIGS. 5A and 5B) is given its offset index i0=5.

Figure 5B:
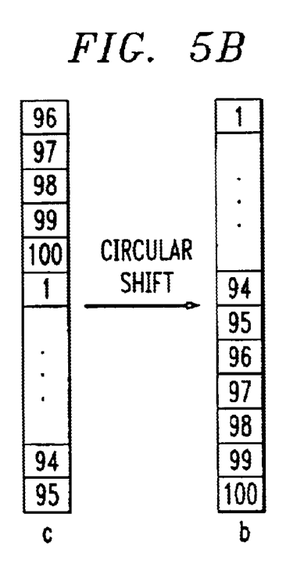
FIG. 5B graphically illustrates a second example implementation of the user dependent processing unit of FIG. 3B employing an exact inverse of the second circular shift illustrated in FIG. 5A.

Thus, for the first user, mapper 203 at transmitter 200 (FIG. 2A) causes a circular shift in input array "b" via user index u=i0=3 to yield the output array "c", as shown in FIG. 4A. Then, for the first user, demapper 214 at receiver 210 (FIG. 2B) causes the exact inverse function as mapper 203. That is demapper 214 causes the inverse circular shift from the received version of the output array "c" from mapper 203 to yield a received version of array "b". As shown in FIGS. 5A and 5B, operation of mapper 203 in transmitter 200 and demapper 214 in receiver 210 is identical, except that the unique user index for the second user is u=i0=5.

Again, it is noted that demapper 214 in receiver 210 must be placed in a location of the receiver 210 chain corresponding to the location where mapper 203 in transmitter 200 is placed in the transmitter chain.

Additionally, it should be noted that although in this example the user index "u" is show as being equal to the cyclic shift for both the first and second users, the user index can be in the form of some prescribed relationship to the cyclic shift and does not have to be equal to it.

Figure 6A:
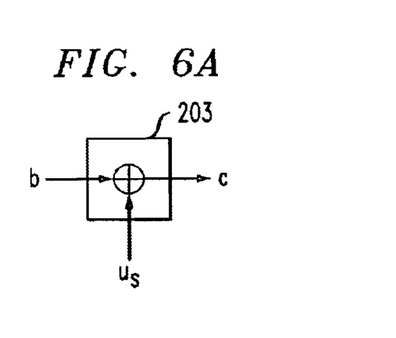
FIG. 6A shows, in simplified block diagram, another example of a user processing unit, i.e., mapper, employing exclusive ORing of the end-user dependent function and segment of information bits that may be advantageously employed in the transmitter of FIG. 2A.
Figure 6B:
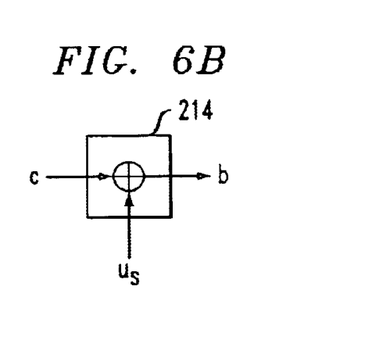
FIG. 6B shows, in simplified block diagram, another example of a user processing unit, i.e., de-mapper, employing exclusive ORing of the end-user dependent function and segment of information bits that may be advantageously employed in the receiver of FIG. 2B.

FIG. 6A shows, in simplified block diagram, another example of a user processing unit, i.e., mapper 203, employing exclusive ORing of a sequence of bits associated with the end-user index "$u_s$" and input array "b" information bits that may be advantageously employed in the transmitter 200 of FIG. 2A, and FIG. 6B shows, in simplified block diagram, another example of a user processing unit, i.e., demapper, 214 also employing exclusive ORing of a sequence bits associated with end-user index "$u_s$" and received array "c" of bits that may be advantageously employed in the receiver 210 of FIG. 2B. It will be apparent to those skilled in the art that the exclusive ORing is on a bit-by-bit basis of the sequence of bits associated with user index "$u_s$" and the input array bits to the exclusive ORing unit. Except for the exclusive ORing function, operation of mapper 203 of FIG. 6A is identical to mapper 203 of FIG. 3A and described above. Similarly, except for the exclusive ORing function, operation of demapper 214 of FIG. 6B is identical to that of demapper 214 of FIG. 3B and described above.

Further, the above description has described the user index "u" and user sequence "us" as each being unique to a particular end-user, it should be noted that in certain applications it is desirable to multicast information to a plurality of end-users. In such applications the user index employed needs to be common to all the users that the information is to be multicast to.

Figure 7A:
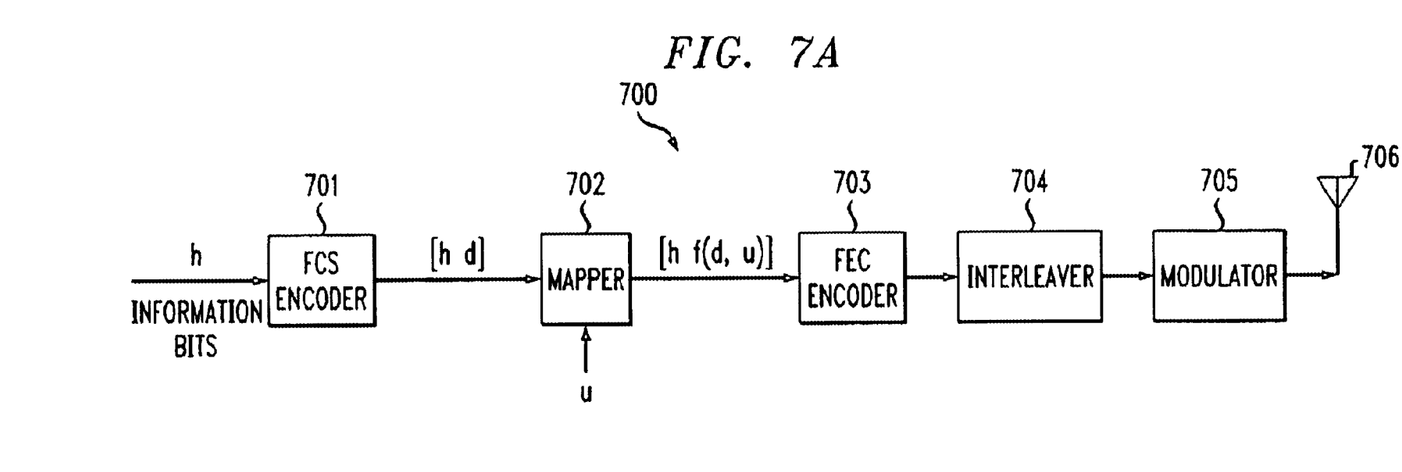
FIG. 7A shows, in simplified block diagram form, a transmitter including another embodiment of the invention that may be utilized in the base station and/or remote mobile units shown in FIG. 1.

FIG. 7A shows, in simplified block diagram form, a transmitter 700 including another embodiment of the invention that may be utilized in the base station 101 and/or remote mobile units 102 shown in FIG. 1. As shown, information bits, e.g., in segments (arrays) "h", from some data source are supplied to frame check sum (FCS) encoder 701. FCS encoder 701 generates and adds redundancy bits in the form of array "d" to the bits in the array h to form a first block having a fixed number of bits, i.e., first block of bits [h d], in well known fashion. Note that array d is the frame check sequence generated by FCS encoder 701. The first block of bits [h d] from FCS encoder 701 is supplied to mapper 702. Mapper 702 is an end-user dependent processing unit that in this example generates an array of bits that is a function of the redundancy bits generated by FCS encoder 701 and a function associated with the user dependent index "u". The function associated with the user index "u" may be a cyclic shift or some sequence of bits. An output from mapper 702 is a second block of bits [h f(d,u)]. It is noted that mapper 203 inserts a specific user dependent function unique to a particular end-user into the first block of bits [h d], and that the second block of bits [h f(d,u)] outputted from mapper 702 is the same size in bits as the block of bits [h d] inputted to it. Consequently, the operation of mapper 702 does not cost any overhead in the bit stream being transmitted. It is further noted that [f(d,u)] has the same number of bit as "d". The second block of bits [h f(d,u)] is supplied to FEC encoder 703 that also adds redundancy bits to it for the purpose of error correction at the remote receiver and forms an output block of bits to be transmitted. The output block of bits is supplied to bit interleaver 704. Interleaver 704 basically changes the order of the bits in the output block of bits supplied to it for the purpose of randomizing bursty noise in the corresponding wireless data traffic channel, in well known fashion. The interleaved block of bits is supplied to modulator 705 where it is modulated and then supplied to antenna 706 for transmission. In this example, mapper 702 performs a user dependent transformation of the array d. The user dependent transformation may take the form of exclusive ORing of array d with a user dependent sequence of bits associated with user index "u". Alternatively, the transformation may take the form of a permutation of the bits of array d that includes an exclusive ORing operation.

Figure 7B:
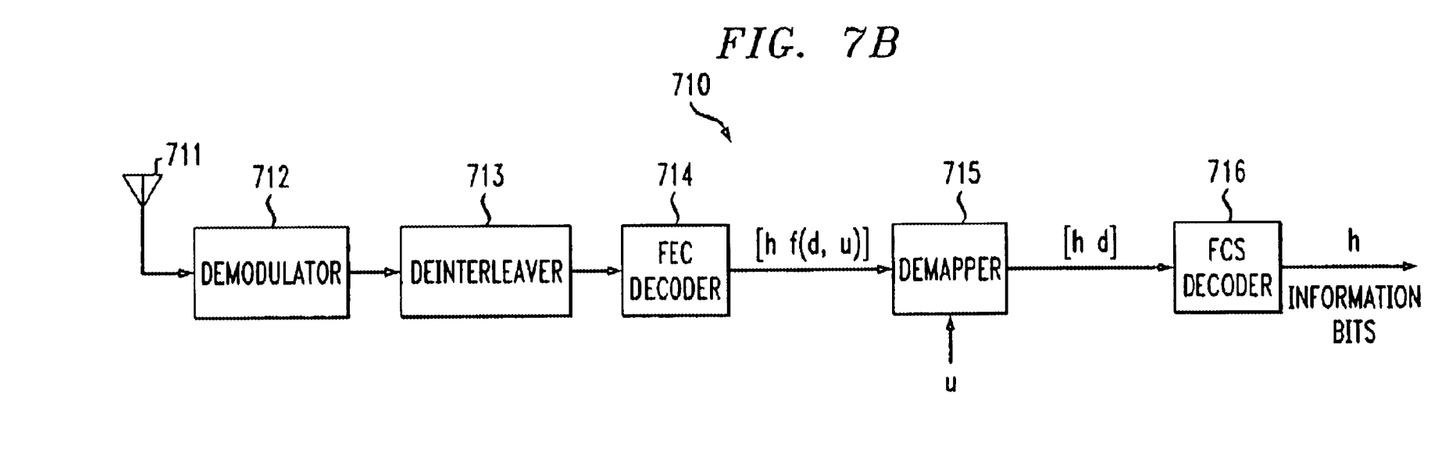
FIG. 7B shows, in simplified block diagram form, a receiver also including another embodiment of the invention that may be utilized in the base station and/or remote mobile units shown in FIG. 1.

FIG. 7B shows, in simplified block diagram form, a receiver 710 also including another embodiment of the invention that may be utilized in the base station 101 and/or remote mobile units 102 shown in FIG. 1. Specifically, a transmitted signal from, for example, transmitter 700 in base station 101 is received at antenna 711 at receiver 710. The received signal is supplied to demodulator 712 where it is demodulated as a series of symbols, in well known fashion. The symbols are supplied to deinterleaver 713 that operates to organize the bits of the symbols to be in proper order for processing by forward error correction (FEC) decoder 714. FEC decoder 714 converts the symbols to a block of decoded FEC bits and also corrects for symbol errors caused by channel impairments or noise, in known fashion. The decoded FEC bits outputted by FEC decoder 714 is block of bits [h f(d,u)] and is supplied to demapper 715. Demapper 715 is also supplied with a function associated with the user dependent index "u". The function associated with the user index "u" may be a cyclic shift or some sequence of bits.

Demapper 715 operates to perform the exact inverse function of mapper 702 to yield block of bits [h d]. block of bits [h d] is supplied to frame check sum (FCS) decoder 716 that decodes it to generate as an output array of bits h. FCS decoder 716 is also operative to detect whether any uncorrected errors still remain. If so, the decoded array of bits h from FEC decoder 716 is discarded. Otherwise, FCS decoder 716 removes the FCS redundancy bits from the decoded array of bits and the resulting array of information bits, namely, array h, is forwarded for further processing.

It should be noted that although the embodiments shown in FIGS. 7A and 7B have been described in terms of using an exclusive ORing function in mapper 702 and demapper 715 a general mapping function or a cyclic shifting mapping function may also be equally employed.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. Apparatus for use in a transmitter in a wireless multiple access communications system comprising:
    an error detection encoder supplied with an input array of information bits for generating an array of error detection redundancy bits and for adding said array of error detection redundancy bits to said array of information bits to generate a first block of bits having a first prescribed number of bits;
    a mapper supplied with an input block of bits having a prescribed number of bits and being based on said first block of bits, and a particular user index for generating a second block of bits having said first prescribed number of bits as said first block of bits in accordance with a prescribed function of bits of said input block of bits and said particular user index, said prescribed function being a unique particular user dependent function assigned only to at least one particular user; and
    a modulator for modulating a transmit signal based on said second block of bits for transmission to at least one remote user receiver that is associated with said particular user index,
    wherein said information bits are identified to said at least one particular user without any need to transmit additional user identification information.

2. The apparatus as defined in claim 1 wherein said input block of bits is said first block of bits.

3. The apparatus as defined in claim 1 further including an error correction encoder supplied with said first block of bits for generating said input block of bits in accordance with a prescribed error correction encoding process.

4. The apparatus as defined in claim 3 wherein said error detection encoder includes a frame check sum encoder and wherein said error correction encoder includes a forward error correction encoder.

5. The apparatus as defined in claim 1 further including an error correction encoder supplied with said first block of bits for generating an output block of bits in accordance with a prescribed error correction encoding process and a bit interleaver for interleaving bits of said output block of bits supplied from said error correction encoder to generate said input block of bits.

6. The apparatus as defined in claim 1 wherein said prescribed function is a cyclic shift of the bits of said input block of bits.

7. The apparatus as defined in claim 6 wherein said cyclic shift is in accordance with a prescribed relationship of said particular user index.

8. The apparatus as defined in claim 7 further including an error correction encoder supplied with said first block of bits for generating said input block of bits in accordance with a prescribed error correction encoding process.

9. The apparatus as defined in claim 7 further including an error correction encoder supplied with said first block of bits for generating an output block of bits in accordance with a prescribed error correction encoding process and a bit interleaver for interleaving bits of said output block of bits supplied from said error correction encoder to generate said input block of bits.

10. The apparatus as defined in claim 1 wherein said prescribed function is of bits of said array of error detection redundancy bits of said input block of bits and said particular user index.

11. The apparatus as defined in claim 10 wherein said prescribed function is a cyclic shift of said bits of said array of error detection redundancy bits in accordance with a prescribed relationship of said particular user index.

12. The apparatus as defined in claim 1 wherein said prescribed function is an exclusive ORing function.

13. The apparatus as defined in claim 12 wherein said exclusive ORing function is of prescribed bits of said input block of bits and a sequence of bits associated with said particular user index.

14. The apparatus as defined in claim 13 wherein said first prescribed bits of said input block are the bits of said first block of bits.

15. The apparatus as defined in claim 13 further including an error correction encoder supplied with said first block of bits for generating an output block of bits in accordance with a prescribed error correction encoding process and a bit interleaver for interleaving bits of said output block of bits supplied from said error correction encoder to generate said input block of bits.

16. The apparatus as defined in claim 13 wherein said prescribed bits of said input block are bits of said array of redundancy bits.

17. The apparatus as defined in claim 13 further including an error correction encoder supplied with said first block of bits for generating said input block of bits in accordance with a prescribed error correction encoding process.

18. The apparatus as define in claim 1 wherein said error detection encoder includes a frame check sum encoder.

19. The apparatus as defined in claim 1 wherein said wireless multiple access communications system is a mobile wireless multiple access communications system.

20. The apparatus as defined in claim 1 wherein said wireless multiple access communications system is a mobile wireless orthogonal frequency division multiplexing multiple access communications system.

21. Apparatus for use in a receiver in a wireless multiple access communications system comprising:
    a demodulator for demodulating a received signal to obtain received blocks of bits each having a first prescribed number of bits;
    a demapper supplied with said a receive input block of bits based on said received block of bits and a particular user index for generating a second receive block of bits having said first prescribed number of bits as said received blocks of bits in accordance with a prescribed function of bits of said received block of bits and said particular user index, said prescribed function being a unique user dependent function assigned only to at least one particular user; and an error detection decoder supplied with said second receive block of bits for generating an array of decoded error detection redundancy bits which are subtracted from said second receive block of bits to generate a receive output array of information bits, for determining whether any errors are present in said receive output array of information bits and being adapted to discard said receive output array of information bits when errors are detected therein, wherein said information bits are identified to said at least one particular user without any need to transmit additional user identification information.

22. The apparatus as defined in claim 21 wherein said receive input block of bits is said receive block of bits.

23. The apparatus as defined in claim 21 further including a bit deinterleaver for deinterleaving bits of said receive block of bits to generate said receive input block of bits.

24. The apparatus as defined in claim 21 further including a bit deinterleaver for deinterleaving bits of said receive block of bits to generate a receive output block of bits and including an error correction decoder supplied with said receive output block of bits from said bit deinterleaver for generating said receive input block of bits in accordance with a prescribed error correction decoding process.

25. The apparatus as defined in claim 24 wherein said error detection decoder includes a frame check sum decoder and wherein said error correction decoder includes a forward error correction decoder.

26. The apparatus as defined in claim 21 wherein said prescribed function is a cyclic shift of the bits of said receive input block of bits.

27. The apparatus as defined in claim 26 wherein said cyclic shift is in accordance with a prescribed relationship of said particular user index.

28. The apparatus as defined in claim 27 further including a bit deinterleaver for deinterleaving bits of said receive block of bits to generate said receive input block of bits.

29. The apparatus as defined in claim 27 further including a bit deinterleaver for deinterleaving bits of said receive block of bits to generate a receive output block of bits and an error correction decoder supplied with said receive output block of bits from said bit deinterleaver for generating said receive input block of bits in accordance with a prescribed error correction decoding process.

30. The apparatus as defined in claim 21 wherein said prescribed function is of bits of said array of decoded error detection redundancy bits of said receive input block of bits and said particular user index.

31. The apparatus as defined in claim 30 wherein said prescribed function is a cyclic shift of bits of said array of decoded error detection redundancy bits in accordance with a prescribed relationship of said particular user index.

32. The apparatus as defined in claim 21 wherein said prescribed function is an exclusive ORing function.

33. The apparatus as defined in claim 32 wherein said exclusive ORing function is of prescribed bits of said receive input block of bits and a sequence of bits associated with said particular user index.

34. The apparatus as defined in claim 32 wherein said prescribed bits of said receive input block are the bits of said received block of bits.

35. The apparatus as defined in claim 32 wherein said prescribed bits of said received input block are bits of said array of decoded error detection redundancy bits.

36. The apparatus as defined in claim 32 further including a bit deinterleaver for deinterleaving bits of said receive block of bits to generate said receive input block of bits.

37. The apparatus as defined in claim 32 further including a bit deinterleaver for deinterleaving bits of said receive block of bits to generate a receive output block of bits and an error correction decoder supplied with said receive output block of bits from said bit deinterleaver for generating said input block of bits in accordance with a prescribed error correction decoding process.

38. The apparatus as defined in claim 21 wherein said error detection decoder includes a frame check sum decoder.

39. The apparatus as defined in claim 21 wherein said wireless multiple access communications system is a mobile wireless multiple access communications system.

40. The apparatus as defined in claim 21 wherein said wireless multiple access communications system is a mobile wireless orthogonal frequency division multiplexing multiple access communications system.

41. A mobile wireless multiple access communications system comprising:

a transmitter including an error detection encoder supplied with an input array of information bits for generating an array of error detection redundancy bits and for adding said array of error detection redundancy bits to said array of information bits to generate a first block of bits having a first prescribed number of bits, a mapper supplied with an input block of bits having a prescribed number of bits and being based on said fist block of bits, and a particular user index for generating a second block of bits having said first prescribed number of bits as said first block of bits in accordance with a first prescribed function of bits of said input block of bits and said particular user index, said prescribed function being a unique particular user dependent function assigned only to said at least one particular user, and a modulator for modulating a transmit signal based on said second block of bits for transmission to at least one particular remote user receiver that is associated with said particular user index, wherein said information bits are identified to said at least one particular user without any need to transmit additional user identification information; and a receiver including a demodulator for demodulating a received signal to obtain a first receive block of bits having a first prescribed number of bits, a demapper supplied with a receive input block of bits based on said first received block of bits and a particular user index for generating a second receive block of bits having said first prescribed number of bits as said received blocks of bits in accordance with a second prescribed function of bits of said received block of bits and said particular user index, said second prescribed function being a unique particular user dependent function assigned only to said at least one particular user, and an error detection decoder supplied with said second received block of bits for generating an array of decoded error detection redundancy bits which are subtracted from said second receive block of bits to generate a receive output array of information bits, for determining whether any errors are present in said receive output array of information bits and being adapted to discard said receive output array of information bits when errors are detected therein, wherein said information bits are identified to said at least one particular user without any need to transmit additional user identification information.

42. The system as defined in claim 41 wherein said transmitter further includes an error correction encoder supplied with said first block of bits for generating said input block of bits in accordance with a prescribed error correction encoding process, and said receiver further includes a bit deinterleaver for deinterleaving bits of said first receive block of bits to generate said receive input block of bits.

43. The system as defined in claim 41 wherein said transmitter further includes an error correction encoder supplied with said first block of bits for generating an output block of bits in accordance with a prescribed error correction encoding process and a bit interleaver for interleaving bits of said output block of bits supplied from said error correction encoder to generate said input block of bits, and wherein said receiver further includes a bit deinterleaver for deinterleaving bits of said first receive block of bits to generate a receive output block of bits and including an error correction decoder supplied with said receive output block of bits from said bit deinterleaver for generating said receive input block of bits in accordance with a prescribed error correction decoding process.

44. The system as defined in claim 41 wherein in said transmitter said first prescribed function is a cyclic shift of the bits of said input block of bits, and wherein in said receiver said second prescribed function is a cyclic shift of the bits of said receive input block of bits.

45. The system as defined in claim 44 wherein said cyclic shift is in accordance with a prescribed relationship of said particular user index.

46. The system as defined in claim 45 wherein said transmitter further includes an error correction encoder supplied with said first block of bits for generating said input block of bits in accordance with a prescribed error correction encoding process, and said receiver further includes a bit deinterleaver for deinterleaving bits of said first receive block of bits to generate said receive input block of bits.

47. The system as defined in claim 45 wherein said transmitter further includes an error correction encoder supplied with said first block of bits for generating an output block of bits in accordance with a prescribed error correction encoding process and a bit interleaver for interleaving bits of said output block of bits supplied from said error correction encoder to generate said input block of bits, and wherein said receiver further includes a bit deinterleaver for deinterleaving bits of said first receive block of bits to generate a receive output block of bits and an error correction decoder supplied with said receive output block of bits from said bit deinterleaver for generating said receive input block of bits in accordance with a prescribed error correction decoding process.

48. The system as defined in claim 41 wherein in said transmitter said first prescribed function is of said bits of said array of error detection redundancy bits of said input block of bits and said particular user index, and wherein in said receiver said second prescribed function is of said bits of said array of decoded error detection redundancy bits of said receive input block of bits and said particular user index.

49. The system as defined in claim 48 wherein in said transmitter said first prescribed function is a cyclic shift of said bits of said array of error detection redundancy bits in accordance with a prescribed relationship of said particular user index, and wherein in said receiver said second prescribed function is a cyclic shift of said bits of said array of decoded error detection redundancy bits in accordance with a prescribed relationship of said particular user index.

50. The system as defined in claim 41 wherein each of said first prescribed function and said second prescribed function is an exclusive ORing function.

51. The system as defined in claim 50 wherein in said transmitter said exclusive ORing function is of prescribed bits of said input block of bits and a sequence of bits associated with said particular user index, and in said receiver said exclusive ORing function is of prescribed bits of said receive input block of bits and a sequence of bits associated with said particular user index.

52. The system as defined in claim 51 wherein said transmitter further includes an error correction encoder supplied with said first block of bits for generating said input block of bits in accordance with a prescribed error correction encoding process, and said receiver further includes a bit deinterleaver for deinterleaving bits of said first receive block of bits to generate said receive input block of bits.

53. The system as defined in claim 51 wherein said transmitter further includes an error correction encoder supplied with said first block of bits for generating an output block of bits in accordance with a prescribed error correction encoding process and a bit interleaver for interleaving bits of said output block of bits supplied from said error correction encoder to generate said input block of bits, and wherein said receiver further includes a bit deinterleaver for deinterleaving bits of said first receive block of bits to generate a receive output block of bits and an error correction decoder supplied with said receive output block of bits from said bit deinterleaver for generating said receive input block of bits in accordance with a prescribed error correction decoding process.

54. The system as defined in claim 51 wherein in said transmitter said prescribed bits of said input block of bits are bits of said array of error detection redundancy bits, and wherein in said receiver said prescribed bits of said receive input block of bits are bits of said array of decoded error detection redundancy bits.

55. The system as define in claim 41 wherein said error detection encoder includes a frame check sum encoder, and wherein said error detection decoder includes a frame check sum decoder.

56. The system as defined in claim 41 wherein said mobile wireless multiple access communications system is a mobile wireless orthogonal frequency division multiplexing multiple access communications system.

57. A method for use in a transmitter in a wireless multiple access communications system comprising the steps of:
  error detection encoding an input array of information bits to generate an array of error detection redundancy bits;
  adding said array of error detection redundancy bits to said array of information bits to generate a first block of bits having a first prescribed number of bits;
  mapping an input block of bits having a prescribed number of bits and being based on said first block of bits in accordance with a prescribed function of bits of said input block of bits and said particular user index to generate a second block of bits having said Prescribed number of bits, said prescribed function being a unique particular user dependent function assigned only to at least one particular user; and
  modulating a signal based on said second block of bits for transmission to at least one particular remote user receiver,
  wherein said information bits are identified to said at least one particular user without any need to transmit additional user identification information.

58. The method as defined in claim 57 wherein said input block of bits is said first block of bits.

59. The method as defined in claim 57 further including a step of error correction encoding said first block of bits to generate an output block of bits in accordance with a prescribed error correction encoding process.

60. The method as defined in claim 59 further including a step of interleaving bits of an output block of bits resulting from said error correction encoding to generate said input block of bits.

61. The method as defined in claim 57 wherein said prescribed function is of bits of said array of error detection redundancy bits of said input block of bits and said particular user index.

62. The method as defined in claim 61 wherein said prescribed function is a cyclic shift of said bits of said array of error detection redundancy bits in accordance with a prescribed relationship of said particular user index.

63. The method as defined in claim 57 wherein said prescribed function is a cyclic shift of the bits of said input block of bits.

64. The method as defined in claim 63 wherein said cyclic shift is in accordance with a prescribed relationship of said particular user index.

65. The method as defined in claim 64 further including the steps of error correction encoding said first block of bits to generate said input block of bits in accordance with a prescribed error correction encoding process.

66. The method as defined in claim 65 further including a step of interleaving bits of an output block of bits resulting from said error correction encoding to generate said input block of bits.

67. The method as defined in claim 57 wherein said prescribed function is an exclusive ORing function.

68. The method as defined in claim 67 wherein said exclusive ORing function is of prescribed bits of said input block of bits and a sequence of bits associated with said particular user index.

69. The method as defined in claim 68 further including the steps of error correction encoding said first block of bits to generate said input block of bits in accordance with a prescribed error correction encoding process.

70. The method as defined in claim 69 further including a step of interleaving bits of an output block of bits resulting from said error correction encoding to generate said input block of bits.

71. The method as defined in claim 68 wherein said prescribed bits of said input block are bits of said array of error detection redundancy bits.

72. The method as define in claim 57 wherein said step of error detection encoding includes a step of frame check sum encoding.

73. The method as defined in claim 57 wherein said wireless multiple access communications system is a mobile wireless orthogonal frequency division multiplexing multiple access communications system.

74. A method for use in a receiver in a wireless multiple access communications system comprising the steps of:
demodulating a received signal to obtain a first receive block of bits having a first prescribed number of bits;
demapping a receive input block of bits based on said first received block of bits to generate a second receive block of bits having said first prescribed number of bits in accordance with a prescribed function of bits of said first received block of bits and said particular user index, said prescribed function being a unique particular user dependent function assigned only to said at least one particular user; and
error detection decoding said second receive block of bits to generate decoded error detection redundancy bits which are subtracted from said second receive block of bits to generate a receive output array of information bits, to determine whether any errors are present in said receive output array of information bits and being adapted to discard said receive output array of information bits when errors are detected therein,
wherein said information bits are identified to said at least one particular user without any need to transmit additional user identification information.

75. The method as defined in claim 74 wherein said receive input block of bits is said first received block of bits.

76. The method as defined in claim 74 further including a step of deinterleaving bits of said receive block of bits to generate said receive input block of bits.

77. The method as defined in claim 76 further including a step of error correction decoding a deinterleaved block of bits resulting from said step of deinterleaving to generate said receive input block of bits in accordance with a prescribed error correction decoding process.

78. The method as defined in claim 74 wherein said prescribed function is of bits of said array of decoded error detection redundancy bits of said receive input block of bits and said particular user index.

79. The method as defined in claim 78 wherein said prescribed function is a cyclic shift of bits of said array of decoded error detection redundancy bits in accordance with a prescribed relationship of said particular user index.

80. The method as defined in claim 74 wherein said prescribed function is a cyclic shift of the bits of said receive input block of bits.

81. The method as defined in claim 80 wherein said cyclic shift is in accordance with a prescribed relationship of said particular user index.

82. The method as defined in claim 81 further including a step of deinterleaving bits of said receive block of bits to generate said receive input block of bits.

83. The method as defined in claim 82 further including a step of error correction decoding a deinterleaved block of bits resulting from said step of deinterleaving to generate said input block of bits in accordance with a prescribed error correction decoding process.

84. The method as defined in claim 74 wherein said prescribed function is an exclusive ORing function.

85. The method as defined in claim 84 wherein said exclusive ORing function is of prescribed bits of said receive input block of bits and a sequence of bits associated with said particular user index.

86. The method as defined in claim 85 further including a step of deinterleaving bits of said receive block of bits to generate said receive input block of bits.

87. The method as defined in claim 86 further including a step of error correction decoding a deinterleaved block of bits resulting from said step of deinterleaving to generate said input block of bits in accordance with a prescribed error correction decoding process.

88. The method as defined in claim 86 wherein said prescribed bits of said received input block are bits of said array of decoded-error detection redundancy bits.

89. The method as define in claim 74 wherein said step of error detection decoding includes a step of frame check sum decoding.

90. The method as defined in claim 74 wherein said wireless multiple access communications system is a mobile wireless orthogonal frequency division multiplexing multiple access communications system.

91. A method for use in a mobile wireless multiple access communications system comprising the steps of:
in a transmitter error detection encoding an input array of information bits to generate an array of error detection redundancy bits, adding said array of error detection redundancy bits to said array of information bits to generate a first block of bits having a first prescribed number of bits, mapping an input block of bits having a prescribed number of bits and being based on said first block of bits in accordance with a first prescribed function of bits of said input block of bits and said particular user index to generate a second block of bits having said first prescribed number of bits, said prescribed function being a unique particular user dependent function assigned only to said at least one particular user, and modulating a transmit signal based on said second block of bits for transmission to a particular remote user receiver, wherein said information bits are identified to said at least one particular user without any need to transmit additional user identification information; and in a receiver demodulating a received signal to obtain received blocks of bits each having a fist prescribed number of bits, demapping said receive input block of bits based on said received block of bits to generate a second receive block of bits having said first prescribed number of bits in accordance with a second prescribed function of bits of said received block of bits and said particular user index, said second prescribed function being a unique particular user dependent function assigned only to said at least one particular user, and error detection decoding said second receive block of bits to generate decoded error detection redundancy bits which are subtracted from said second receive block of bits to generate a receive output array of information bits, to determine whether any errors are present in said receive output array of information bits and being adapted to discard said receive output array of information bits when errors are detected therein, wherein said information bits are identified to said at least one particular user without any need to transmit additional user identification information.

92. The method as defined in claim 91 wherein said transmitter further includes a step of error correction encoding said first block of bits to generate said input block of bits in accordance with a prescribed error correction encoding process, and said receiver further includes a step of deinterleaving bits of said receive block of bits to generate said receive input block of bits.

93. The method as defined in claim 92 wherein said transmitter further includes a step of interleaving bits of an output block of bits resulting from said error correction encoding to generate said input block of bits, and wherein said receiver further including a step of error correction decoding a deinterleaved block of bits resulting from said step of deinterleaving to generate said receive input block of bits in accordance with a prescribed error correction decoding process.

94. The method as defined in claim 91 wherein in said transmitter said first prescribed function is of said bits of said array of error detection redundancy bits of said input block of bits and said particular user index, and wherein in said receiver said second prescribed function is of said bits of said array of decoded error detection redundancy bits of said receive input block of bits and said particular user index.

95. The method as defined in claim 94 wherein in said transmitter said first prescribed function is a cyclic shift of said bits of said army of error detection redundancy bits in accordance with a prescribed relationship of said particular user index, and wherein in said receiver said second prescribed function is a cyclic shift of said bits of said array of decoded error detection redundancy bits in accordance with a prescribed relationship of said particular user index.

96. The method as defined in claim 91 wherein said first prescribed function is a cyclic shift of the bits of said input block of bits, and wherein said second prescribed function is a cyclic shift of the bits of said receive input block of bits.

97. The method as defined in claim 96 wherein said cyclic shift is in accordance with a prescribed relationship of said particular user index.

98. The method as defined in claim 97 wherein said transmitter further includes a step of error correction encoding said first block of bits to generate said input block of bits in accordance with a prescribed error correction encoding process, and said receiver further includes a step of deinterleaving bits of said receive block of bits to generate said receive input block of bits.

99. The method as defined in claim 98 wherein said transmitter further includes a step of interleaving bits of an output block of bits resulting from said error correction encoding to generate said input block of bits, and wherein said receiver further including a step of error correction decoding a deinterleaved block of bits resulting from said step of deinterleaving to generate said receive input block of bits in accordance with a prescribed error correction decoding process.

100. The method as defined in claim 91 wherein in said transmitter said first prescribed function is an exclusive ORing function, and wherein in said receiver said prescribed function is an exclusive ORing function.

101. The method as defined in claim 100 wherein in said first prescribed function said exclusive ORing function is of prescribed bits of said input block of bits and a sequence of bits associated with said particular user index, and in said second prescribed function said exclusive ORing function is of prescribed bits of said receive input block of bits and a sequence of bits associated with said particular user index.

102. The method as defined in claim 101 wherein said transmitter further includes a step of error correction encoding said first block of bits to generate said input block of bits in accordance with a prescribed error correction encoding process, and said receiver further includes a step of deinterleaving bits of said receive block of bits to generate said receive input block of bits.

103. The method as defined in claim 102 wherein said transmitter further includes a step of interleaving bits of an output block of bits resulting from said error correction encoding to generate said input block of bits, and wherein said receiver further including a step of error correction decoding a deinterleaved block of bits resulting from said step of deinterleaving to generate said receive input block of bits in accordance with a prescribed error correction decoding process.

104. The method as defined in claim 101 wherein said prescribed bits of said input block are bits of said array of error detection redundancy bits, and wherein said prescribed bits of said received input block are bits of said array of decoded error detection redundancy bits.

105. The method as defined in claim 104 wherein said transmitter further includes a step of error correction encoding said first block of bits to generate said input block of bits in accordance with a prescribed error correction encoding process, and said receiver further includes a step of deinterleaving bits of said receive block of bits to generate said receive input block of bits.

106. The method as defined in claim 105 wherein said transmitter further includes a step of interleaving bits of an output block of bits resulting from said error correction encoding to generate said input block of bits, and wherein said receiver further including a step of error correction decoding a deinterleaved block of bits resulting from said step of deinterleaving to generate said receive input block of bits in accordance with a prescribed error correction decoding process.

107. The method as defined in claim 91 wherein said mobile wireless multiple access communications system is a mobile wireless orthogonal frequency division multiplexing multiple access communications system.

* * * * *